United States Patent [19]

Sugiyama et al.

[11] Patent Number: 5,757,455
[45] Date of Patent: May 26, 1998

[54] HYBRID ALIGNMENT TYPE LIQUID CRYSTAL DISPLAY

[75] Inventors: Takashi Sugiyama, Kanagawa; Toru Hashimoto, Tokyo; Shunsuke Kobayashi, 3-13-40, Nishi-Ohizumi, Nerima-ku, Tokyo; Yasufumi Iimura, Tokyo, all of Japan

[73] Assignees: Stanley Electric Co., Ltd., Kanagawa; Shunsuke Kobayashi; Yasumi Iimura, both of Tokyo, all of Japan

[21] Appl. No.: 728,483

[22] Filed: Oct. 11, 1996

[30] Foreign Application Priority Data

Oct. 13, 1995 [JP] Japan ................... 7-265759

[51] Int. Cl.⁶ .................... G02F 1/1335; G02F 1/1337
[52] U.S. Cl. ............... 349/129; 349/130; 349/118; 349/120; 349/124
[58] Field of Search ......................... 349/128, 129, 349/130, 132, 134, 118, 120

[56] References Cited

U.S. PATENT DOCUMENTS

| | | | |
|---|---|---|---|
| 4,097,128 | 6/1978 | Matsumoto et al. | 349/78 |
| 5,155,610 | 10/1992 | Hikmet et al. | 349/127 |
| 5,280,375 | 1/1994 | Tsuda et al. | 349/128 |
| 5,410,422 | 4/1995 | Bos | 349/132 |
| 5,477,358 | 12/1995 | Rosenblatt et al. | 349/130 |
| 5,477,359 | 12/1995 | Okazaki | 349/130 |
| 5,519,524 | 5/1996 | Fergason et al. | 349/149 |
| 5,638,201 | 6/1997 | Bos et al. | 349/129 |

FOREIGN PATENT DOCUMENTS

| | | |
|---|---|---|
| 0632311 A1 | 1/1995 | European Pat. Off. |
| 1-243025 | 9/1989 | Japan |

OTHER PUBLICATIONS

IBM Technical Disclosure Bulletin, vol. 36, No. 12, Dec., 1993, New York, US, pp. 547–548, XP000419062 "Symmetrical Multicolor Multi-Domain Homeotropic and Hybrid Oriented Nematic Liquid Crystal Displays Using periodic Triangular Tooth Waveform Surfaces".

*Primary Examiner*—William L. Sikes
*Assistant Examiner*—Toan Ton
*Attorney, Agent, or Firm*—Frishauf, Holtz, Goodman, Langer & Chick

[57] ABSTRACT

A liquid crystal display which includes a pair of substrates, a liquid crystal layer sandwiched between the pair of substrates, and electrodes respectively formed on facing surfaces of the pair of substrates for applying an electric field to each pixel. A first alignment film is formed on the surface of one of the pair of substrates and covers the electrodes formed thereon. The first alignment film aligns the liquid crystal molecules in the liquid crystal layer in a direction generally vertical to a plane of the substrates. A second alignment film is formed on the surface of the other of the pair of substrates and covers the electrodes formed thereon. The second alignment film aligns the liquid crystal molecules in a direction generally parallel to the plane of the substrates and gives a pre-tilt to the liquid crystal molecules. An area corresponding to each pixel on the second alignment film is divided into a plurality of domains each having a single easy direction, and at least two domains in the pixel area have different easy directions. In addition, the easy directions of the two domains are different by 180 degrees, and the liquid crystal display also includes a pair of polarizers disposed outside of the pair of substrates such that polarizing axes of the pair of polarizers intersect at a right angle and such that an angle between each of the easy directions of the two domains and the polarizing axes of each polarizer is approximately 45 degrees.

10 Claims, 15 Drawing Sheets

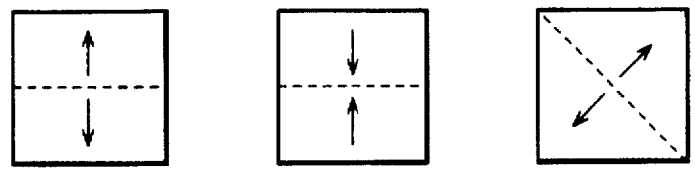
FIG. 6A   FIG. 6B   FIG. 6C
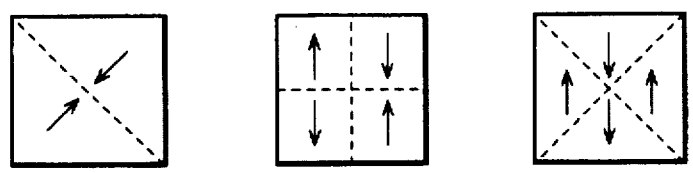
FIG. 6D   FIG. 6E   FIG. 6F
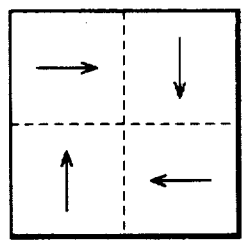 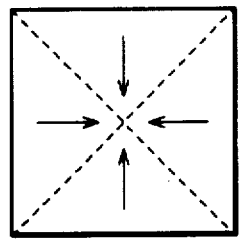 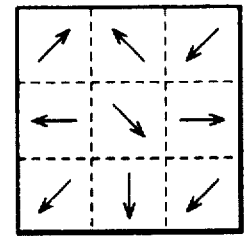
FIG. 6G   FIG. 6H   FIG. 6I
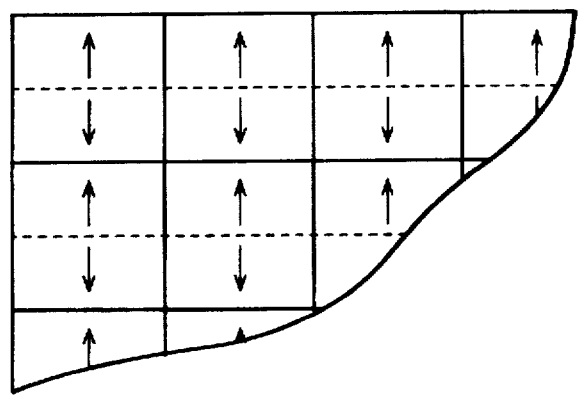
FIG. 6J FIG. 15A
FIG. 15B
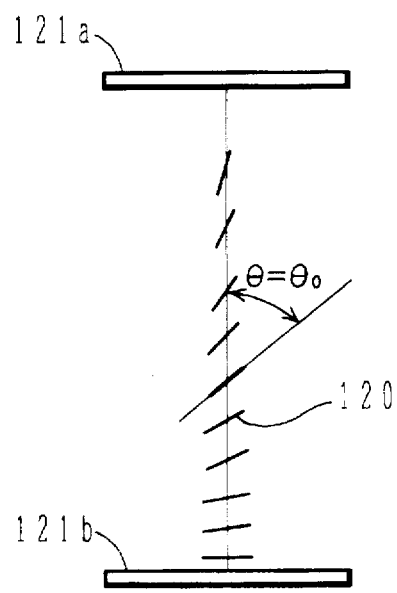
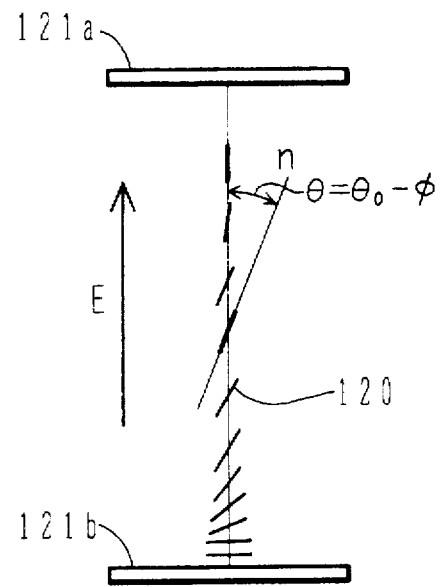

HYBRID ALIGNMENT TYPE LIQUID CRYSTAL DISPLAY

BACKGROUND OF THE INVENTION a) Field of the Invention

The present invention relates to a liquid crystal display and more particularly to a liquid crystal display whose liquid crystal layer has a hybrid alignment.

b) Description of the Related Art

A molecule alignment of a liquid crystal layer of a liquid crystal display is changed to a different molecule alignment by an external action such as an external electric field. An optical change caused by the molecule alignment is recognized as a change in visual sense.

In order to form a particular alignment state of liquid crystal molecules, it is common that the surfaces of glass substrates between which liquid crystals are filled are subjected to an alignment process. For conventional twist nematic (TN) type liquid crystal displays, a so-called rubbing method has been used as the alignment process by which glass substrates sandwiching liquid crystals are rubbed in one direction with cotton cloth or the like.

For the manufacture of TN type liquid crystal displays whose molecules twist by 90 degrees between the two substrates, the rubbing direction of one substrate is made perpendicular to that of the other substrate.

As shown in FIG. 13, as an alignment film 100 is subjected to a rubbing process, a liquid crystal molecule 101 on the alignment film 100 has a pre-tilt with a pre-tilt angle $\theta_r$. As used herein, an "easy direction" is the direction of a vector 103 which is a vertical projection on the substrate of a vector 102 which points from one end of the liquid crystal molecule 101 on the substrate side toward the other rising end, and a pre-tilt angle is the angle between the substrate plane and the vector 102.

The easy direction of the molecule is generally parallel to the rubbing direction indicated by an arrow 104. Therefore, if the rubbing direction is unidirectional, the easy direction of the liquid crystal molecules on the alignment film is also unidirectional.

As a voltage is applied to a TN type liquid crystal display, liquid crystal molecules tilt in the direction of rising the pre-tilted rising end. If the easy direction of liquid crystal molecules is unidirectional, the rising directions of liquid crystal molecules are the same.

The measured visual angle characteristics of a conventional TN type liquid crystal display therefore have a visual angle area with high contrast shifted to a particular angle area. Namely, the conventional TN type liquid crystal display has a visual angle dependency such that an image on the display is easy to recognize in one direction and is difficult in another direction. The conventional TN type liquid crystal display having such a visual angle dependency has a very low contrast when viewed at a certain angle relative to the display screen, and in a worst case a highlight and shadow on the display screen are reversed. Such, a reversal is particularly likely to occur in a in half tone representation.

SUMMARY OF THE INVENTION

It is an object of the present invention to provide a liquid crystal display having good visual angle characteristics.

According to one aspect of the present invention, there is provided a liquid crystal display comprising: a pair of substrates disposed parallel and having a gap therebetween; a liquid crystal layer sandwiched between the pair of substrates and containing liquid crystal molecules; electrodes respectively formed on surfaces facing each other of the pair of substrates for applying an electric field to the liquid crystal layer for each pixel; a first alignment film formed on the surface of one of the pair of substrates and covering one electrodes, the first alignment film aligning the liquid crystal molecules in the direction generally vertical to the substrate plane; and a second alignment film formed on the surface of the other of the pair of substrates and covering the other electrodes, the second alignment film aligning the liquid crystal molecules in the direction generally parallel to the substrate plane and giving a pre-tilt to the liquid crystal molecules, an area corresponding to each pixel on the second alignment film being divided into a plurality of domains each having a single easy direction, and at least two domains in the pixel area having different easy directions.

The second alignment film has a plurality of easy directions for each pixel area so that the visual angle dependency can be reduced. Since the alignment of liquid crystal molecules is set to have a structure such that the alignment direction is generally vertical on one substrate side and generally parallel to the substrate plane on the other substrate side, a liquid crystal molecule at the center of the liquid crystal cell can be given a pre-tilt angle even when a voltage is not applied to the liquid crystal cell. In particular, a tilt angle caused by inductive deformation can be imparted to a liquid crystal molecule without any particular threshold value of the applied voltage.

Still, further a hybrid alignment type liquid crystal display having a plurality of domains with different easy directions for each pixel gives a fast response speed and a small visual angle dependency, as compared to a conventional TN type liquid crystal display.

BRIEF DESCRIPTION OF THE DRAWINGS

FIGS. 6A to 6J are plan views of pixel areas showing examples of alignment patterns for a single pixel area according to the first embodiment.

FIGS. 15A and 15B are cross sectional views of a liquid crystal cell of a hybrid alignment type liquid crystal display, illustrating the alignment state of liquid crystal molecules with the display being turned on and off respectively.

DETAILED DESCRIPTION OF THE PREFERRED EMBODIMENTS

Figure 14:
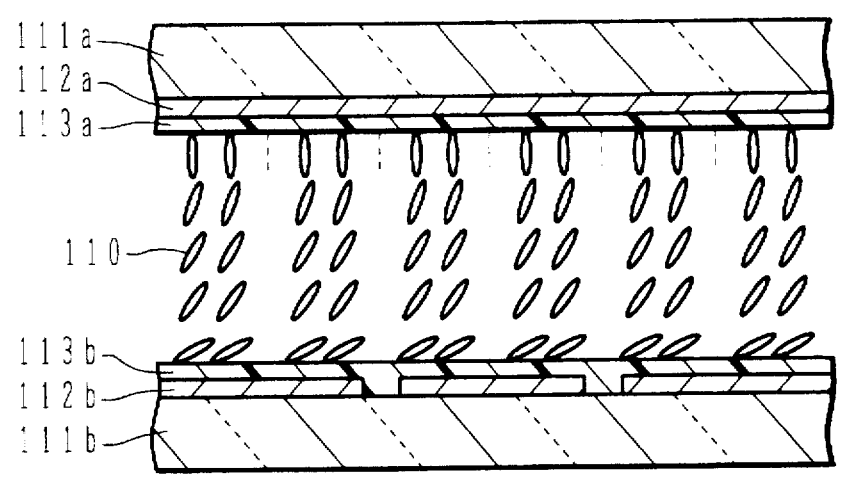
FIG. 14 is a cross sectional view of a liquid crystal cell of a hybrid alignment type liquid crystal display.

FIG. 14 is a cross sectional view of a liquid crystal cell of a hybrid alignment type liquid crystal display. An electrode 112a and alignment film 113a are formed on one substrate 111a. The alignment film 113a aligns liquid crystal molecules in contact with the alignment film 113a generally in the direction vertical to the substrate plane. Another alignment film 113b is formed on electrode 112b on substrate 111b for aligning liquid crystal molecules generally parallel to the substrate plane. Therefore, as shown in FIG. 14, liquid crystal molecules between the upper and lower substrates continuously change their alignment states from the vertical alignment state at the surface of the alignment film 113a to the parallel alignment state at the surface of the alignment film 113b.

Similar to a homeotropic alignment type liquid crystal display and other displays, a hybrid alignment type liquid crystal display utilizes for display a change in a birefringence index to be caused by a change in a tilt angle of each liquid crystal molecule relative to a normal to the substrate, upon application of a voltage.

Similar to a conventional TN type liquid crystal display, a hybrid alignment type liquid crystal display is also associated with an issue of visual sense dependency. A rubbing process is generally performed for an alignment film on which liquid crystal molecules are aligned parallel to the substrate plane. In this case, the rubbing direction is unidirectional so that the easy direction of liquid crystal molecules also becomes unidirectional.

The novel structure of a hybrid alignment type liquid crystal display with good visual angle characteristics and the manufacture method therefor will be described with reference to preferred embodiments.

A hybrid alignment type liquid crystal display of the first embodiment will be described with reference to FIGS. 1A to 5.

Figure 1A:
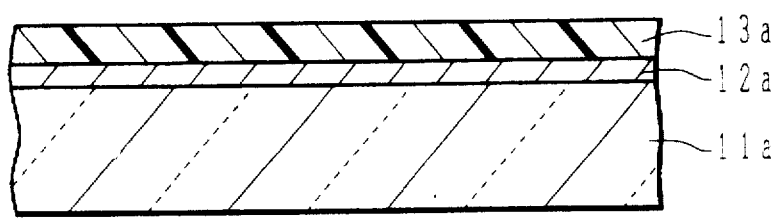
FIGS. 1A and 1B are cross sectional views illustrating manufacture processes for a liquid crystal cell according to a first embodiment.
Figure 1B:
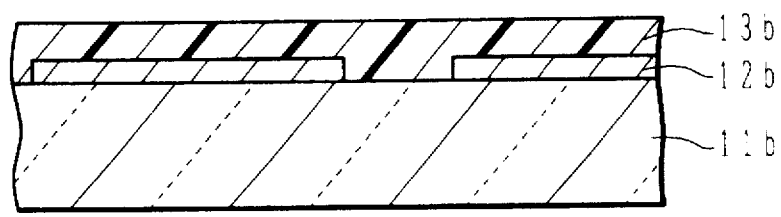

First, a manufacture method for a liquid crystal cell will be described with reference to FIGS. 1A to 3B. As shown in FIGS. 1A and 1B, on the surfaces of glass substrates 11a and 11b, line-shaped electrodes 12a and 12b of a simple matrix type were formed. The electrode 12a shown in FIG. 1A extends in the lateral direction of FIG. 1A, and the electrode 12b shown in FIG. 1B extends in the direction vertical to the drawing sheet.

An electrode of an active matrix type with driving elements may be formed. In this case, an electrode connected to elements such as a TFT (thin film transistor) and a MIM (metal insulator metal) is formed for each pixel on the side of one substrate, and a plane electrode or line-shaped electrodes are formed on the side of the other substrate.

Transparent electrodes are formed by using an electrode material such as ITO (indium tin oxide).

As shown in FIG. 1A, an alignment film 13a for aligning liquid crystal molecules vertical to the substrate plane was formed over the surface of the substrate 11a, covering the electrodes 12a. This alignment film 13a was formed by spin coating vertical alignment type polimide (Nissan Chemical Industries, Ltd. RN-722) to a thickness of about 500 angstroms, and thereafter by drying it for about 1 hour at 180° C. Other alignment film materials for aligning liquid crystal molecules vertical to the substrate plane may be used. For example, vertical alignment agent containing basic chrome complex may be used.

As shown in FIG. 1B, another alignment film 13b for giving liquid crystal molecules a predetermined pre-tilt and an easy direction was formed over the substrate 11b, covering the electrodes 12b. A photosensitive high polymer film was used as the alignment film 13b and the alignment process was performed through a light illumination method.

This light illumination method will be described with reference to FIGS. 2A to 2D. The substrate shown in FIGS. 2A to 2D shows only one pixel area of the whole substrate.

A photosensitive high polymer film is made of a polymer material which structurally changes upon application of light. A so-called polarized light storage film is one kind of photosensitive high polymer film. One type of the film aligns liquid crystal molecules in the direction perpendicular to the polarization direction of absorbed light, and the other type aligns liquid crystal molecules in the direction parallel to the polarization direction of absorbed light. Either of them may be used. In this embodiment, a polyvinyl cinnamate film was used which aligns liquid crystal molecules in the direction perpendicular to the polarization direction of absorbed light.

Figure 2A:
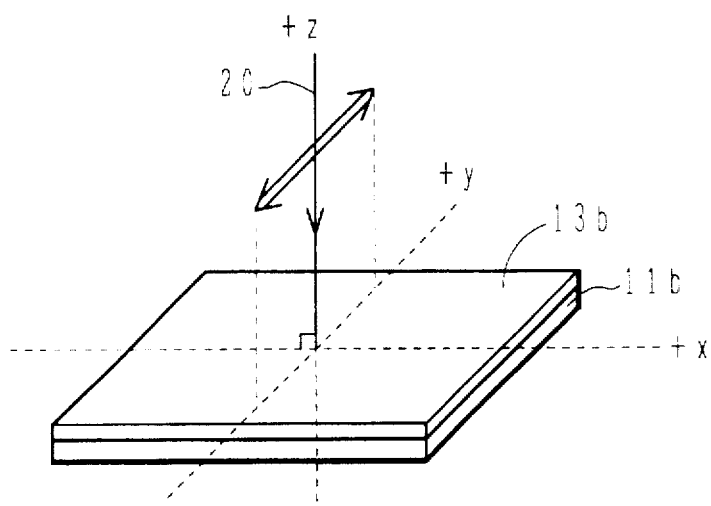
FIGS. 2A to 2D are perspective views of a substrate illustrating an alignment process according to the first embodiment.

As shown in FIG. 2A, polyvinyl cinnamate solution dissolved with mixed solvent of monochlorobenzene and dichloromethane was spin coated with a spinner on the substrate 11b formed with the electrodes. The substrate was dried for 1 hour at about 100° C., and a polyvinyl cinnamate film (alignment film 13b) was formed to a thickness of about 100 nm. In the figures, an electrode is not shown.

Polarized ultraviolet rays in the wavelength range of 250 nm to 330 nm were applied to the surface of the polyvinyl cinnamate film.

As shown in FIG. 2A, the lateral direction of the substrate plane is an x-axis, the depth direction is a y-axis, and a substrate normal direction is a z-axis. Illumination light 20 polarized in the y-z plane was applied to the whole surface of the substrate for about 50 seconds from the +z-axis direction. The polyvinyl cinnamate film 13b was provided with an alignment property for aligning liquid crystal molecules in the x-axis direction.

Figure 2B:
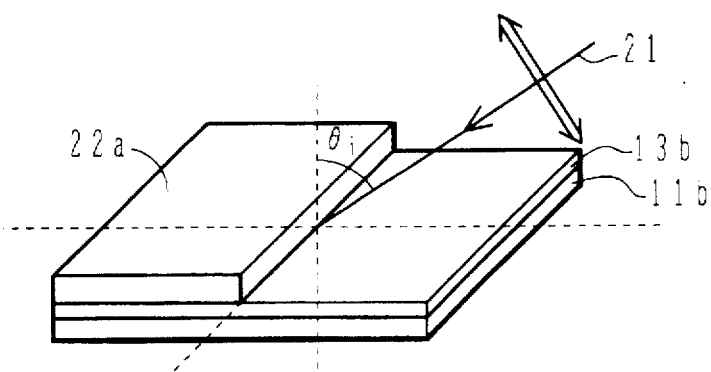

As shown in FIG. 2B, a half area of the surface of each pixel area of the polyvinyl cinnamate film 13b was shielded from light by a photomask 22a. Illumination light 21 was applied to the surface of the alignment film toward the −x-axis direction obliquely at an incident angle of $\theta_1$, the illumination light having a polarization direction perpendicular to the polarization direction of the illumination light 20, i.e., having the polarization direction in the x-z plane.

Figure 2C:
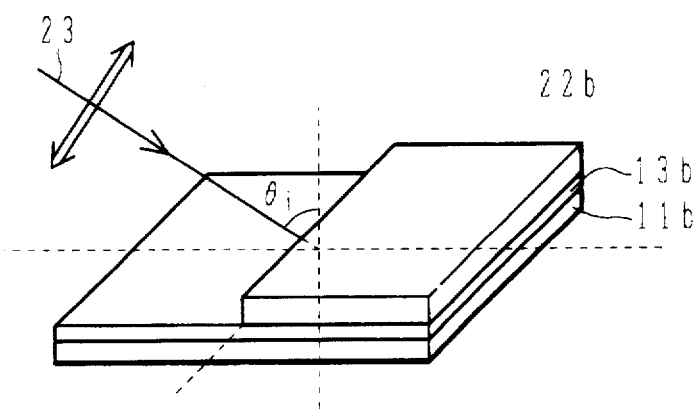

As shown in FIG. 2C, after the photomask 22a was removed, a photomask 22b was formed for shielding light to the area previously applied with ultraviolet rays. Illumination light 23 having the polarization direction in the x-z plane was applied to the alignment film toward the +x-axis opposite to the illumination light 21 obliquely at an incident angle of $\theta_1$. The photomask 22b was removed thereafter. The projected vectors onto the substrate plane of the optical axis vectors (vectors parallel to an optical axis and directing to the light propagation direction) of the illumination light 21 and 23 are different by 180 degrees.

Figure 2D:
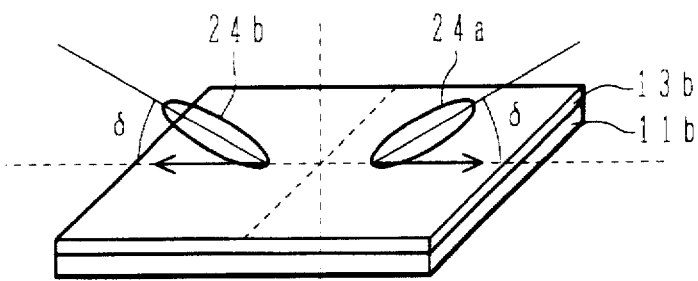

As shown in FIG. 2D, the right half area of one pixel area of the alignment film 13b applied with the illumination light 20 and 21 was given a pre-tilt angle $\delta$ which depends on the incident angle $\theta_1$ of the illumination light 21 and the easy direction directing to the +x-axis direction. The left half area applied with the illumination light 20 and 23 was given a pre-tilt angle $\delta$ which depends on the incident angle $\theta_1$ of the illumination light 23 and the easy direction directing to the −x-axis direction. At each pixel area of the polyvinyl cinnamate film, two types of alignment areas having the easy directions different by 180 degrees were formed. The relation of the obtained easy directions among pixels are not irregular, but the easy direction at corresponding alignment areas points the same direction for all pixels.

In the following, the alignment area given a unidirectional easy direction is called a domain.

As the alignment film 13b , instead of the photosensitive polymer film, a polyimide film, a PVA film, or a polypyrrole film may be used for the rubbing alignment process. In order to form two types of domains having easy directions different by 180 degrees in one pixel area, the alignment film is rubbed in one direction, with the half of each pixel area being covered with a resist mask or the like. After the resist mask is removed, another resist mask is formed to cover the other half area of each pixel area and the alignment film is rubbed in the direction opposite to the previous one direction.

Other alignment films and alignment control methods may be used. For example, an alignment film and alignment control method may be used which gives a pre-tilt and makes directors of liquid crystal molecules generally parallel to the substrate plane (strictly speaking, making directors have tilted alignment near like parallel alignment). An alignment control method may also be used which aligns liquid crystal molecules by a fringe electric field generated at a slit formed in the electrode of each pixel area.

The alignment process by the light illumination method does not generate static electricity as in the case of rubbing the substrate surface. Therefore, this method is effective for a substrate formed with active elements which are likely to be broken by static electricity.

Figure 3A:
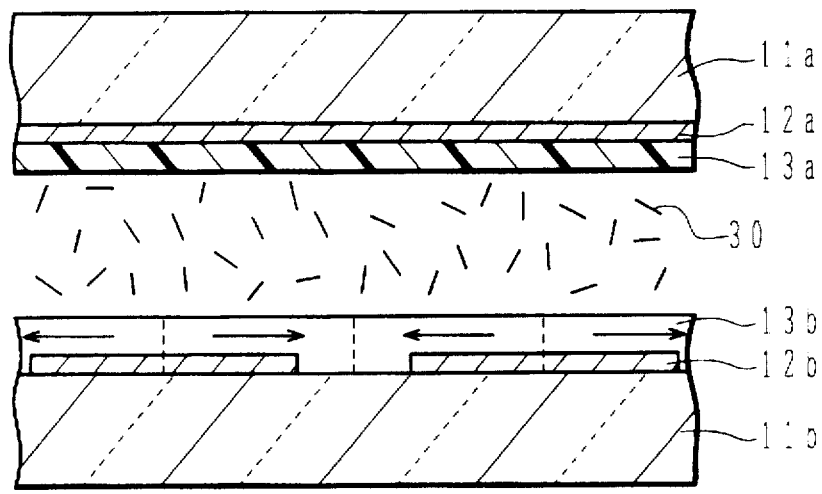
FIGS. 3A and 3B are cross sectional views of a liquid crystal cell illustrating manufacture processes according to the first embodiment.

As shown in FIG. 3A, the substrates 11a and 11b are bonded together with the alignment films facing each other at a gap of about 10μm to form a cell. Nematic liquid crystal material 30 (Merck Japan, ZLI-2293) heated to an isotropic phase was injected into the cell through vacuum injection. Arrows in the alignment film 13b in FIG. 3A indicate the easy directions.

Figure 3B:
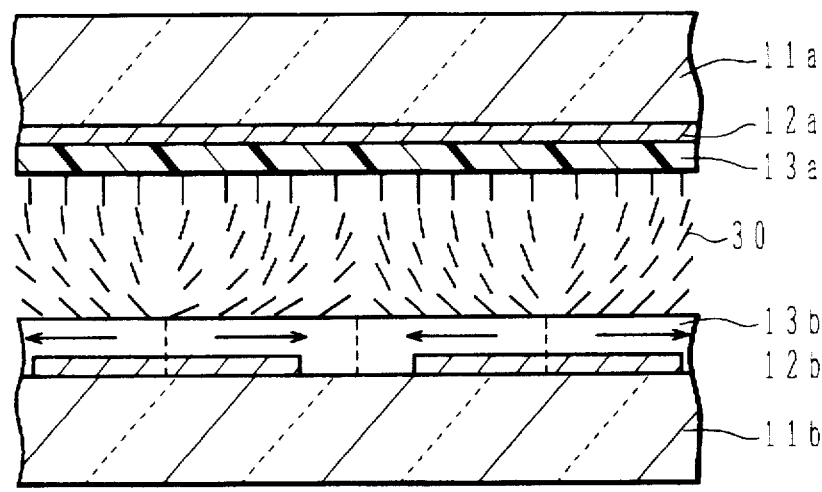

As shown in FIG. 3B, the liquid crystal cell is gradually cooled thereafter to change the liquid crystal material from the isotropic phase to the nematic phase. The liquid crystal material in the nematic phase may be injected, heated to change to the isotropic phase, and then cooled.

The liquid crystal molecules 30 in the cell form the hybrid alignment structure because of the alignment properties of the upper and lower alignment films 13a and 13b. It was possible to form a liquid crystal cell having two types of domains with the easy directions of liquid crystal molecules being different by 180 degrees, at each pixel area defined by the upper and lower electrodes.

Figure 4:
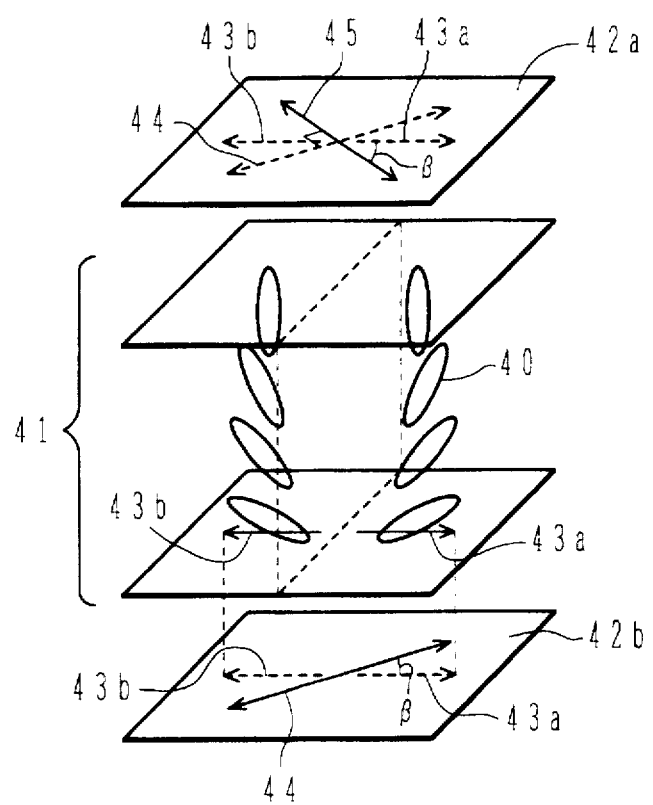
FIG. 4 is a perspective view showing the structure of a liquid crystal display according to the first embodiment.

FIG. 4 is a perspective view schematically showing the structure of a liquid crystal display of the first embodiment. As shown, polarizers 42a and 42b were disposed on both sides of a liquid crystal cell 41, with their polarizing axes 45 and 46 being crossed at a right angle.

Arrows 43a and 43b indicate two easy directions of liquid crystal molecules 40. An angle $\beta$ between the arrow 43a and the polarizing axis 44, 45 of each polarizer was set to about 45 degrees. With this arrangement, the maximum transmittance of the liquid crystal display can be maximized.

Figure 5A:
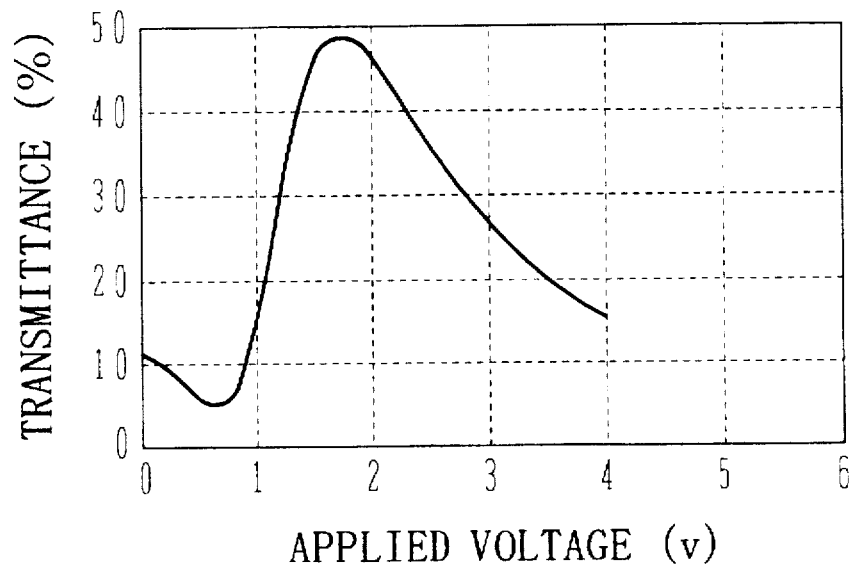
FIGS. 5A and 5B are respectively graphs showing the electrooptical characteristics and visual angle characteristics of the liquid crystal display according to the first embodiment.

FIG. 5A is a graph showing the electrooptical characteristics of a liquid crystal display of the first embodiment formed in the above-described manufacture method. The abscissa represents a voltage applied across the upper and lower electrodes, and the ordinate represents a transmittance measured at the front of the display screen of the liquid crystal display. The transmittance ratio (contrast ratio) was about 9 assuming that the shadow state is at the minimum transmittance with an applied voltage of 0.6 volt and the highlight state is at the maximum transmittance with an applied voltage of 1.8 volt.

Figure 5B:
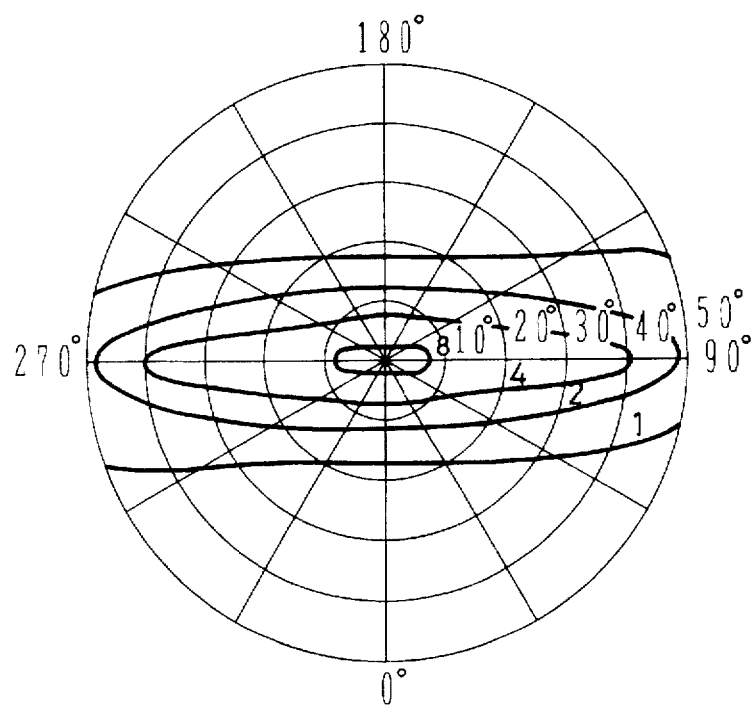

FIG. 5B is a graph showing the visual angle characteristics of the liquid crystal display of the first embodiment. The center of the graph corresponds to a certain position on the display screen of the liquid crystal display, and the coordinates of a measurement point are represented by an azimuth angle (0° to 360° C.) and a polar angle (0° to 50° C.). Curves drawn in the graph are equi-contrast curves. A numeral at each curve indicates a contrast ratio (1, 2, 4, 8).

The up/down direction of this graph corresponds to the easy directions of liquid crystal molecules. As compared to a conventional hybrid alignment type liquid crystal display, the visual angle dependency of the hybrid alignment type liquid crystal display of the first embodiment is small and there is no direction with a narrow visual angle. As compared to a conventional TN liquid crystal display, an area with no display reversal, particularly in half tone representation, was broadened. And a change in hue when viewed obliquely was reduced.

Further, as compared to a conventional TN liquid crystal display, the hybrid alignment type liquid crystal display of the first embodiment features a fast response speed.

FIGS. 15A and 15B are cross sectional views of a liquid crystal cell of a hybrid alignment type liquid crystal display, illustrating the alignment state of liquid crystal molecules 120 between substrates 121a and 121b with the display being turned on and off respectively. In this example, nematic liquid crystal molecules having a positive dielectric anisotropy is used. In the on-state, i.e., in the state when an electric field E is applied to the liquid crystal cell, the tilt angle $\theta$ of a liquid crystal molecule at the center of the liquid crystal cell, i.e., the angle between the director of a liquid crystal molecule and the normal to the substrate plane, corresponds a difference between an angle $\theta_0$ caused by initial (off-state) elastic deformation and an angle $\Phi$ caused by inductive deformation of an applied voltage.

Figure 16A:
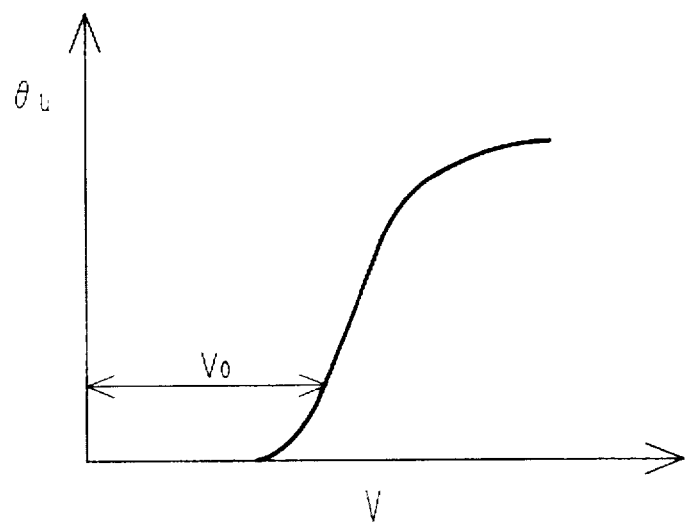
FIGS. 16A and 16B are graphs showing a change in the tilt angle of liquid crystal molecules of a TN type liquid crystal display and a hybrid alignment type liquid crystal display respectively.

FIG. 16A is a graph showing a relationship between a voltage V applied to a usual TN type liquid crystal display and a rise angle $\theta_u$ (angle between the director of an initial liquid crystal molecule and the director of a liquid crystal molecule with an applied voltage) of a liquid crystal molecule at the center of the liquid crystal cell. As shown in FIG. 16A, the rise angle $\theta_u$ of the liquid crystal molecule changes scarcely unless a voltage larger than a threshold voltage (Vo) is applied.

Figure 16B:
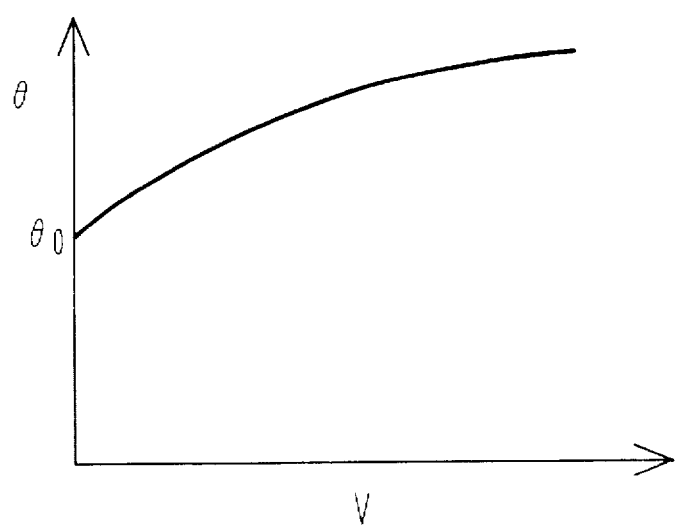

FIG. 16B is a graph showing a relationship between a voltage V applied to a hybrid alignment type liquid crystal display and the rise angle $\theta$ of a liquid crystal molecule at the center of the liquid crystal cell. As shown, there is the angle $\theta_0$ caused by elastic deformation before the voltage is applied (off-state). Therefore, the angle $\theta$ continuously changes as the applied voltage V increases without any particular threshold voltage. The hybrid alignment type liquid crystal display can therefore be switched to turn on and off at a very small applied voltage.

The response speed (switching speed) of a liquid crystal display depends upon a response speed of liquid crystal molecules. As an electric field is applied between the upper and lower substrates, a torque is imparted to each liquid crystal molecule. As the torque becomes large, the response speed of the liquid crystal molecule becomes fast. The torque becomes maximum at an angle of 45° between the electric field and liquid crystal molecule, and becomes minimum at an angle of 90° or 0°. All liquid crystal molecules of a TN type liquid crystal display are generally parallel to the substrate plane near at the threshold voltage throughout the whole depth between the substrates, and the angle between the electric field and liquid crystal molecule is about 90°. In contrast, in the hybrid alignment type liquid crystal display, although the angle between the electric field and liquid crystal molecule near the substrate surface is 0° or 90°, the angle between the electric field and liquid crystal molecule at the center of the liquid crystal cell is near 45°. Therefore, the torque imparted to the liquid crystal molecule at the center of the liquid crystal cell is large and the response speed of the liquid crystal molecule becomes fast. Accordingly, as compared to a conventional TN type liquid crystal display, the response speed (switching speed) of the hybrid alignment type liquid crystal display can be made fast.

As above, the hybrid alignment type liquid crystal display of the first embodiment has good visual angle characteristics and a fast response speed.

In the first embodiment, two domains are formed in each pixel area and the alignment process is performed so that the easy directions of the two domains are different by 180 degrees. There are a number of other alignment patterns with similar effects. Examples are shown in FIGS. 6A to 6I. Each area surrounded by a solid line corresponds to one pixel area. A broken line indicates a boundary line of each domain in one pixel area. An arrow in each domain indicates a easy direction. The up/down direction in each figure coincides with the up/down direction of a liquid crystal display screen.

The alignment state of the first embodiment corresponds to FIG. 6A. The pixel area is halved at the center line into upper and lower domains. The easy direction of each domain is different by 180 degrees, one easy direction being directed upward from the center line of the pixel area and the other easy direction being directed downward from the center line. Other pixel areas are also subjected to similar alignment processes as shown in FIG. 6J. The whole area of the alignment film also has two easy directions.

Conversely with FIG. 6A, the alignment process may be performed so that the alignment directions of liquid crystal molecules in two halved domains are directed from the upper and lower sides of the pixel area toward the center line of the pixel area.

As shown in FIGS. 6C and 6D, the pixel area may be divided by a diagonal line into two domains. The pixel area may be divided into four domains as shown in FIGS. 6E and 6F and domains having easy directions different by 180 degrees are alternately disposed. The pixel area may be divided into domains larger than four domains. In any case, it is preferable that the total area of a plurality of domains in one pixel area having the easy direction along one direction is equal to the total area of a plurality of domains having the easy direction along the other direction different by 180 degrees from the one direction.

In the above examples, two types of easy directions different by 180 degrees are formed. A larger number of easy directions may be formed in each pixel area. Three or more of domains and a plurality of alignment directions may be formed in each pixel area. For example, as shown in FIGS. 6G or 6H, one pixel area may be divided at two center lines or at two diagonal lines into four equal domains and the alignment process is performed so that the alignment directions of adjacent two domains are made different by 90 degrees. As shown in FIG. 6I, one pixel area may be divided into a larger number of domains and the easy direction is given randomly to each domain.

Forming a larger number of easy directions is effective for the case where the visual angle characteristics are given prominence over contrast ratio or for the case where achromatic color is desired relative to color hue. In this case, the relationship between the easy direction of liquid crystal molecules and the optical directions of the polarizers cannot be specified unanimously. Therefore, the positional relationship which gives the maximum transmittance must be properly selected.

Next, the second embodiment will be described with reference to FIG. 7 and FIGS. 8A and 8B. The second embodiment shows an example of the structure of a hybrid alignment type liquid crystal display which has a higher contrast ratio and two domains with the easy directions different by 180 degrees.

The manufacture method for a liquid crystal cell is similar to the first embodiment excepting that the gap between substrates of the liquid crystal cell is set to about 8 μm.

Figure 7:
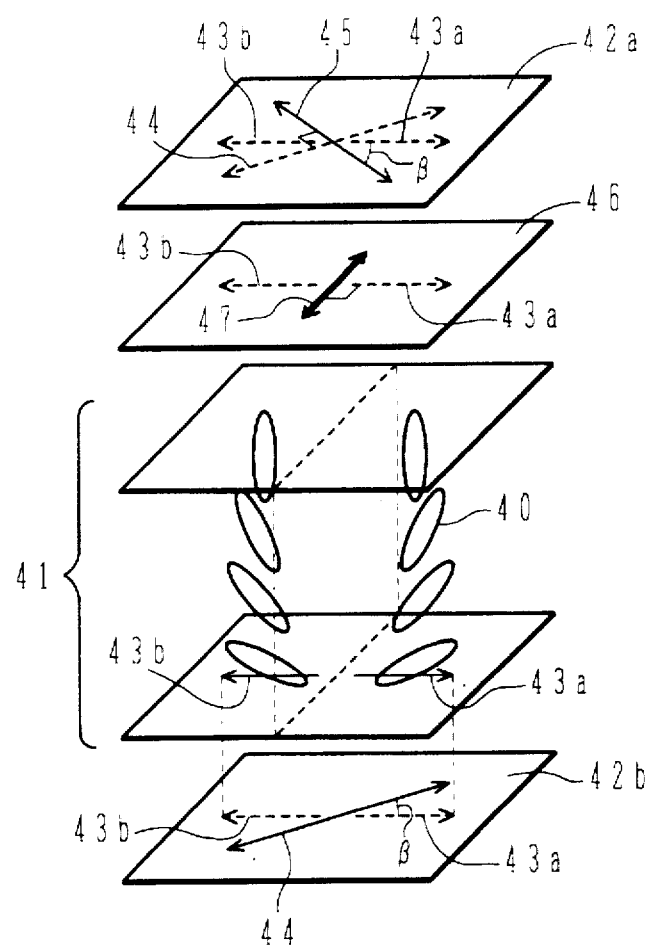
FIG. 7 is a perspective view showing the structure of a liquid crystal display according to a second embodiment.

FIG. 7 is a perspective view showing the structure of a liquid crystal display of the second embodiment. The structure is substantially the same as that of the hybrid alignment type liquid crystal display of the first embodiment. The different point is an addition of a retardation plate 46 between a liquid crystal cell 41 and one polarizer 42a. This retardation plate 46 has a retardation value of 100 nm and a uniaxial positive birefringence index. The retardation plate 46 was mounted so that the optical axis direction 47 of the uniaxial birefringence index becomes parallel to the substrate plane and intersects at a right angle with the easy directions 43a and 43b of the alignment films.

Figure 8A:
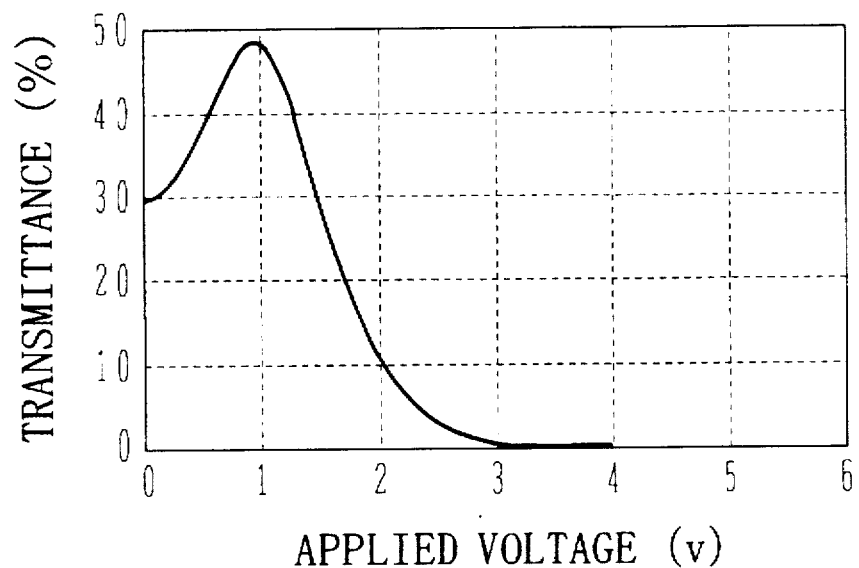
FIGS. 8A and 8B are respectively graphs showing the electrooptical characteristics and visual angle characteristics of the liquid crystal display according to the second embodiment.

FIG. 8A is a graph showing the relationship between the applied voltage and transmittance of the hybrid alignment type liquid crystal display of the second embodiment. The contrast ratio was 100 assuming that the shadow state is at the minimum transmittance with an applied voltage of 3.3 volt and the highlight state is at the maximum transmittance with an applied voltage of 1.0 volt.

Figure 8B:
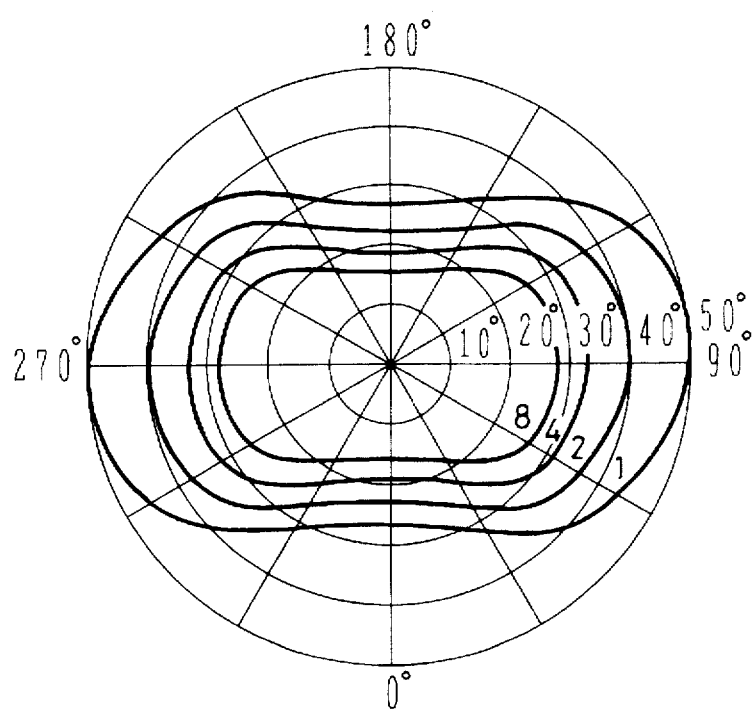

FIG. 8B is a graph showing the visual angle characteristics of the liquid crystal display of the second embodiment. This graph is similar to the graph described with FIG. 5B. It can be seen that the visual dependency is smaller than the liquid crystal display of the first embodiment. Similar to the first embodiment, the liquid crystal display of the second embodiment scarcely showed display reversal in half tone representation.

As above, by using the retardation plate with the hybrid alignment type liquid crystal display, the visual angle characteristics can be further improved and the contrast ratio can be raised.

Next, the third embodiment will be described. The structure of the liquid crystal display of the third embodiment is substantially the same as that of the second embodiment shown in FIG. 7 excepting that a retardation plate 46 has a retardation value of 400 nm.

Figure 9A:
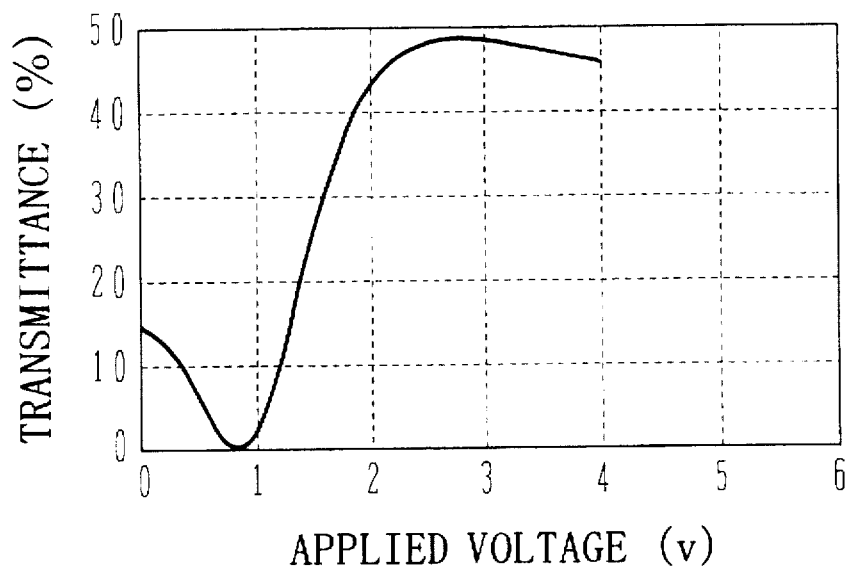
FIGS. 9A and 9B are respectively graphs showing the electrooptical characteristics and visual angle characteristics of a liquid crystal display according to a third embodiment.

FIG. 9A is a graph showing the relationship between the applied voltage and transmittance of the hybrid alignment type liquid crystal display of the third embodiment. As compared to the characteristics of the second embodiment shown in FIG. 8A, the relationship between the applied voltage value with the maximum transmittance and the applied voltage value with the minimum transmittance becomes opposite. However, similar to the second embodiment, it was possible to set the contrast ratio of the maximum transmittance to the minimum transmittance to 100.

Figure 9B:
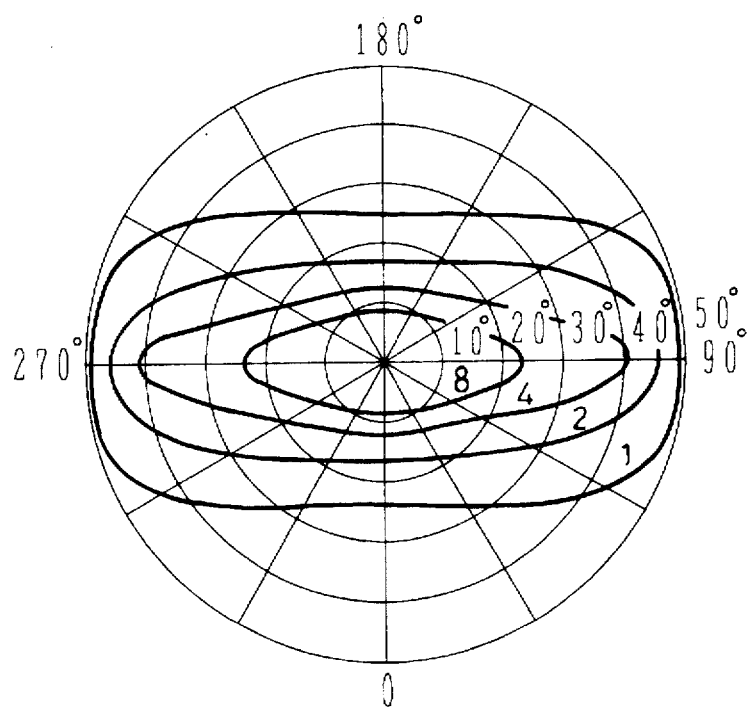

FIG. 9B is a graph showing the visual angle characteristics. As compared to the first embodiment, the visual angle dependency was reduced, and the area with no display reversal in half tone representation was broadened.

As above, addition of the retardation plate between the liquid crystal cell and one polarizer of the hybrid alignment type liquid crystal display allows to obtain a high contrast. Although the applied voltage value at the maximum or minimum transmittance changes with the retardation value, such a high contrast can be obtained by properly selecting the applied voltages at the highlight state and shadow state even if the retardation value is different.

Similar effects may be expected even if a plurality of retardation plates with a uniaxial positive birefringence index are used. In this case, the retardation values of a plurality of retardation plates may be the same or different. Adjustment of wavelength dependence becomes easy, and color hue can be made near achromatic color. A change in color hue as viewed obliquely can also be reduced. It is advantageous if the optical axes of a plurality of retardation plates are shifted, and the position of each retardation plate may be above or under the liquid crystal cell so long as it is placed between the liquid crystal cell and one polarizer.

The fourth embodiment will be described with reference to FIGS. 10 and FIGS. 11A and 11B. The manufacture method for a liquid crystal cell 41 is the same as the first embodiment.

Figure 10:
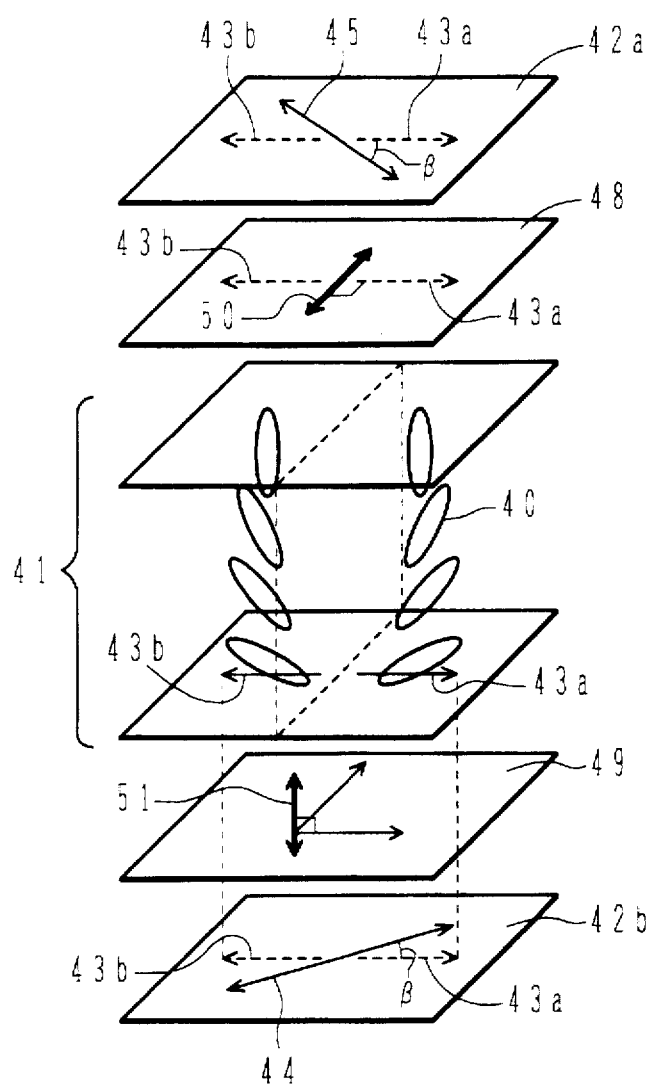
FIG. 10 is a perspective view showing the structure of a liquid crystal display according to a fourth embodiment.

FIG. 10 is a perspective view showing the structure of a hybrid alignment type liquid crystal display of the fourth embodiment. The feature of the fourth embodiment reside in two types of retardation plates 48 and 49 mounted between the liquid crystal cell 41 and opposite polarizers 42a and 42b. The other structures are similar to the first embodiment shown in FIG. 4.

The retardation plate 48 has a retardation value of 100 nm and a uniaxial positive birefringence index. The optical axis 50 of the uniaxial positive birefringence index is parallel to the substrate plane and intersects at a right angle with the easy directions 43a and 43b.

The other retardation plate 49 has a retardation value of 600 nm and a uniaxial negative birefringence index. The optical axis 51 of the uniaxial negative birefringence index is directed to the normal to the substrate plane.

Figure 11A:
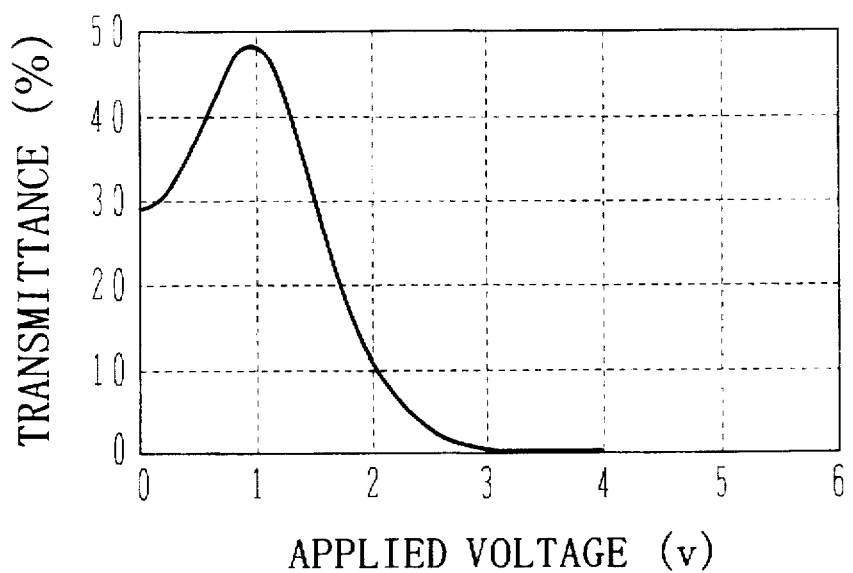
FIGS. 11A and 11B are graphs showing the electrooptical characteristics and visual angle characteristics of the liquid crystal display according to the fourth embodiment.

FIG. 11A is a graph showing the relationship between the applied voltage and transmittance of the hybrid alignment type liquid crystal display of the fourth embodiment. The contrast ratio was about 100 assuming that the shadow state is at the minimum transmittance with an applied voltage of 3.3 volt and the highlight state is at the maximum transmittance with an applied voltage of 1.0 volt. This contrast ratio was the same value as the second and third embodiment.

Figure 11B:
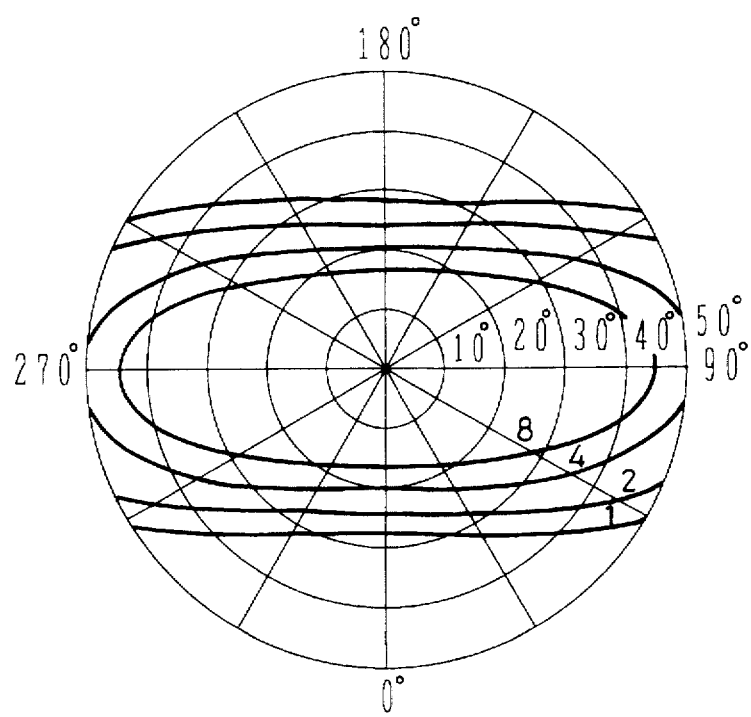

FIG. 11B is a graph showing the visual angle characteristics of the hybrid alignment type liquid crystal display of the fourth embodiment. As compared to the liquid crystal display of the first to third embodiments, it can be seen that the visual dependency is further improved.

The retardation plate with the positive birefringence index is effective for improving mainly the contrast, whereas the retardation plate with the negative birefringence index is effective for improving mainly the visual angle. Therefore, by using both the retardation plates, it is possible to obtain a hybrid alignment type liquid crystal display with a high contrast and better visual angle characteristics.

The retardation value of the retardation plate with a positive birefringence index is determined by the applied voltage for the shadow representation, whereas the retardation value of the retardation plate with a negative birefringence index is properly selected to have the broadest visual angle.

Also in the fourth embodiment, there is no display reversal in half tone representation as in the case of a conventional TN type liquid crystal display.

Figure 12:
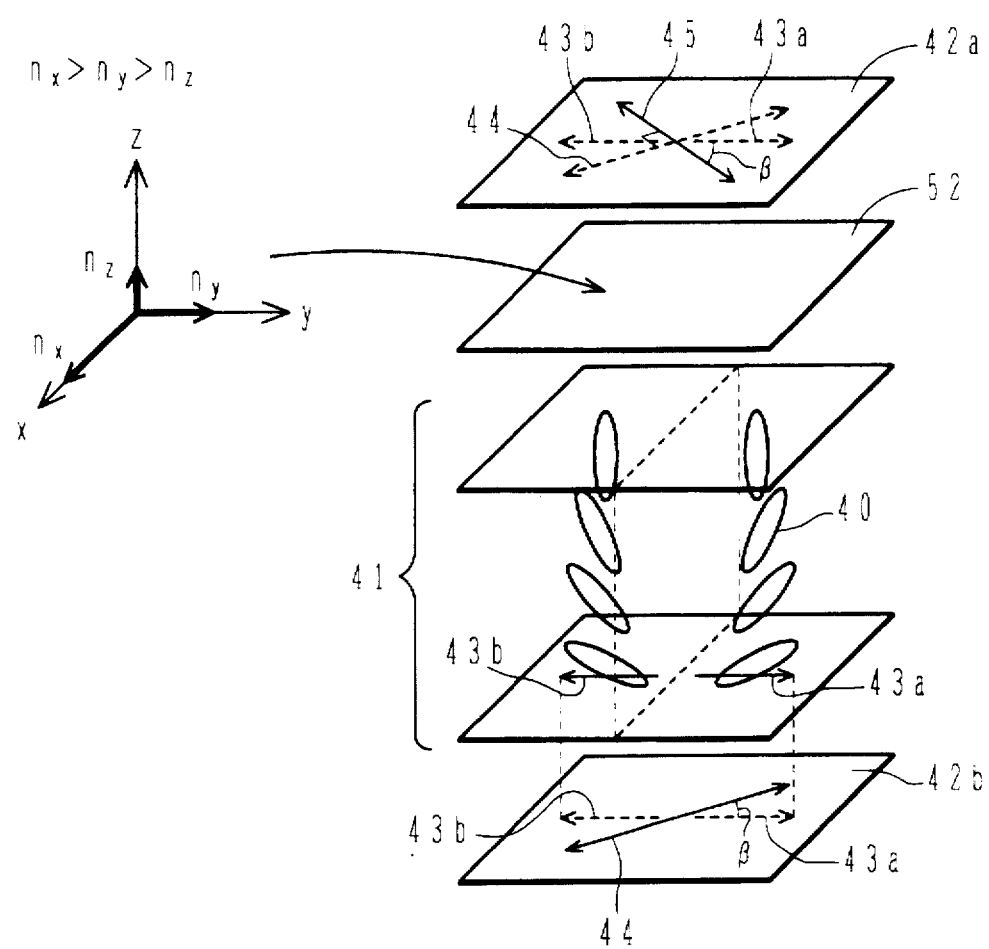
FIG. 12 is a perspective view showing the structure of a liquid crystal display according to a fifth embodiment.
Figure 13:
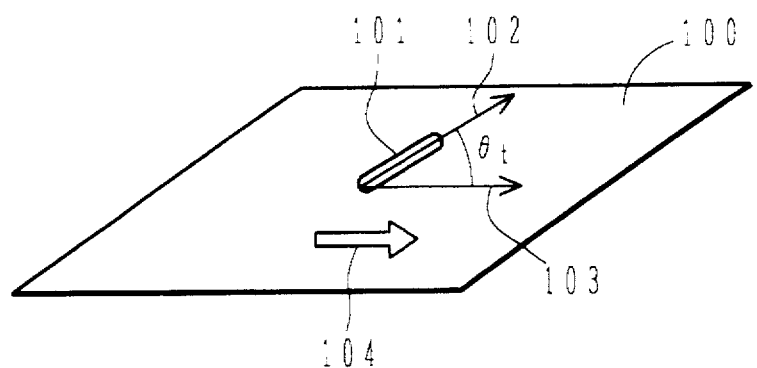
FIG. 13 is a schematic diagram showing a liquid crystal molecule pre-tilted by a rubbing process.

FIG. 12 is a perspective view showing the structure of a hybrid alignment type liquid crystal display of the fifth embodiment. Polarizers 42a and 42b are mounted on opposite sides of a liquid crystal cell 41 and a retardation plate 52 is mounted between the liquid crystal cell 41 and the polarizer 42a. The other structures are similar to the first embodiment.

The retardation plate 52 has biaxial refractive index anisotropy. By representing the axis in the direction vertical to the substrate plane by a z-axis, the axis with a larger main refractive index among two axes intersecting at a right angle and parallel to the substrate plane by an x-axis, and the other axis with a smaller main refractive index by a y-axis, the retardation plate 52 is mounted so that easy directions 43a and 43b intersect with the x-axis at a right angle.

As shown in the left side of the retardation plate 52 in FIG. 12, the main refractive indices $n_x$, $n_y$ and $n_z$ in the x-, y- and z-axes satisfy the relationship of $n_x > n_y > n_z$.

The effects of this retardation plate 52 are expected to be similar to the fourth embodiment using a combination of the retardation plate having the uniaxial positive birefringence index and the optical axis parallel to the substrate plane and the retardation plate having the uniaxial negative birefringence index and the optical axis directed to the substrate normal direction. Similar to the fourth embodiment, with the structure of the liquid crystal display of the fifth embodiment, it is expected to have good visual angle characteristics and a high contrast.

In the hybrid alignment type liquid crystal display of the second to fifth embodiments, a retardation plate having a uniaxial birefringence index or having biaxial birefringence index is mounted. An optical axis of the retardation plate having a uniaxial birefringence index is in the substrate in-plane. In this case, it is preferable from the viewpoint of optical compensation that the retardation plate is mounted so as to make the easy direction of the alignment film intersect at a right angle with the optical axis of the retardation plate. Two main axes among three main axes of the biaxial birefringence index are parallel to the substrate plane. The other main axis is vertical to the substrate plane. In this case, it is preferable from the view point of optical compensation that one of the two main axes parallel to the substrate plane is perpendicular to the easy axis of the liquid crystal molecules.

If there are only two types of domains with the easy directions of the alignment films being different by 180 degrees, it is possible to intersect almost all easy directions at a right angle with the optical axis or the like of the retardation plate in the in-plane of the substrate. However, if a plurality of easy directions imparted to liquid crystal molecules have a relationship other than 180 degrees, e.g., 90 degrees, or if a plurality of alignment directions are contained in each pixel area, the above intersection state is difficult to be maintained for all domains.

Therefore, in the second to fifth embodiments, in order to manufacture a hybrid alignment type liquid crystal display with the maximum optical compensation effects of the retardation plate and a small visual angle dependency, it may be preferable that two types of domains with the easy directions being different by 180 degrees in each pixel area are formed and only two types of easy directions are formed in the whole substrate.

As described herein above, a faster response speed can be obtained by using a hybrid alignment type liquid crystal display without requiring any particular threshold voltage as compared to a conventional TN type liquid crystal display.

If a plurality of domains having different easy directions are formed for each pixel area, the visual angle dependency can be reduced and display reversal in half tone representation can be suppressed.

A higher transmittance can be obtained by setting the polarizing axes of the polarizers sandwiching the liquid crystal cell at an angle of about 45 degrees relative to the easy directions of liquid crystal molecules.

A high contrast and a small visual angle dependency can also be obtained by mounting a retardation plate having a uniaxial positive birefringence index and an optical axis in the in-plane of the substrate, between the liquid crystal cell and polarizer. This becomes more effective if the optical axis direction of the retardation plate in the in-plane of the substrate is made to intersect with the easy directions of the alignment films. The visual angle dependency can be further reduced by mounting a retardation plate with a uniaxial positive birefringence index and a retardation plate with a uniaxial negative birefringence index on opposite sides of the liquid crystal cell.

The present invention has been described herein above in connection with preferred embodiments. However, the invention is not limited only to the above embodiments. It should be apparent to those skilled in the art that various modifications, improvements, combinations and the like can be made without departing from the scope of the appended claims.

We claim:

1. A liquid crystal display comprising:
   a pair of substrates disposed in parallel with a gap therebetween;
   a liquid crystal layer sandwiched between said pair of substrates, said liquid crystal layer containing liquid crystal molecules;
   electrodes respectively formed on facing surfaces of said pair of substrates for applying an electric field to said liquid crystal layer with respect to each pixel of the liquid crystal display;
   a first alignment film formed on the surface of one of said pair of substrates and covering the electrodes formed thereon, said first alignment film aligning the liquid crystal molecules in a direction generally vertical to a plane of said one of said pair of substrates; and
   a second alignment film formed on the surface of the other of said pair of substrates and covering the electrodes formed thereon, said second alignment film aligning the liquid crystal molecules in a direction generally parallel to the plane of said other of said pair of substrates and giving a pre-tilt to the liquid crystal molecules;
   wherein an area corresponding to each pixel on said second alignment film is divided into a plurality of domains each having a single easy direction, and at least two domains in the pixel area have different easy directions; and
   wherein the easy directions of said two domains are different by 180 degrees, and the liquid crystal display further comprises a pair of polarizers disposed outside of said pair of substrates such that polarizing axes of said pair of polarizers intersect at a right angle and such that an angle between each of the easy directions of said two domains and the polarizing axes of each polarizer is approximately 45 degrees.

2. A liquid crystal display according to claim 1, wherein each pixel defined by said electrodes is divided into two domains having a same area.

3. A liquid crystal display according to claim 2, further comprising at least one retardation plate disposed between said pair of substrates and wherein at least one of said polarizers is adjacent to the pair of substrates.

4. A liquid crystal display according to claim 1, further comprising at least one retardation plate disposed between said pair of substrates and wherein at least one of said polarizers is adjacent to the pair of substrates.

5. A liquid crystal display according to claim 4, wherein said retardation plate has a uniaxial positive birefringence index and an optical axis parallel to the planes of the substrates.

6. A liquid crystal display according to claim 5, wherein the optical axis of said retardation plate having the uniaxial positive birefringence index intersects at a right angle with the easy direction of the liquid crystal molecules.

7. A liquid crystal display according to claim 4, further comprising a retardation plate having a uniaxial negative birefringence index between said pair of substrates and wherein at least one of said polarizers is adjacent to said pair of substrates.

8. A liquid crystal display according to claim 4, wherein said retardation plate has a biaxial refractive index, two main axes among three main axes of said retardation plate are parallel to the planes of the substrates, the other main axis is vertical to the planes of the substrates, and a main refractive index in a normal direction to the planes of the substrates is smaller than the other refractive indices.

9. A liquid crystal display according to claim 8, wherein one of said two main axes is perpendicular to the easy axis of the liquid crystal molecules, and the main refractive index associated with said one main axis is larger than the main refractive index associated with the other main axis of said two main axes.

10. A liquid crystal display according to claim 1, wherein said second alignment film comprises a photosensitive polymer film.

* * * * *